United States Patent
Bruce et al.

(10) Patent No.: US 6,892,532 B2
(45) Date of Patent: May 17, 2005

(54) EXHAUST SYSTEM HAVING LOW-STRESS EXHAUST MANIFOLD FLANGE

(75) Inventors: Timothy A. Bruce, Peoria, IL (US); Daniel J. Pelarski, Peoria, IL (US); Matthew D. Rampenthal, Chillicothe, IL (US); Neil A. Terry, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 15 days.

(21) Appl. No.: 10/160,742

(22) Filed: May 31, 2002

(65) Prior Publication Data

US 2003/0221426 A1 Dec. 4, 2003

(51) Int. Cl.[7] ................................................. F01N 7/10
(52) U.S. Cl. ............................. 60/323; 60/280; 60/313
(58) Field of Search ......................... 60/323, 280, 313, 60/274, 597, 605.1, 314, 322, 324; 415/213.1; 29/890.08; 277/591

(56) References Cited

U.S. PATENT DOCUMENTS

| 3,383,092 | A | * | 5/1968 | Cazier ........................ 60/605.1 |
| 3,524,315 | A | * | 8/1970 | Rudert et al. .................. 60/323 |
| 4,294,073 | A | * | 10/1981 | Neff .............................. 60/597 |
| 4,351,154 | A | * | 9/1982 | Richter ....................... 60/605.1 |
| 5,406,795 | A | | 4/1995 | Raub et al. |
| 5,787,709 | A | * | 8/1998 | Watanabe et al. .............. 60/323 |
| 5,934,070 | A | * | 8/1999 | Lagelstorfer .................. 60/323 |
| 6,062,024 | A | * | 5/2000 | Zander et al. ................. 60/323 |
| 6,199,376 | B1 | * | 3/2001 | Maeda ......................... 60/323 |

FOREIGN PATENT DOCUMENTS

| DE | 4030652 | * | 4/1992 |
| EP | 0247631 | * | 12/1987 |
| JP | 64-080718 | * | 3/1989 |

* cited by examiner

*Primary Examiner*—Tu M. Nguyen
(74) *Attorney, Agent, or Firm*—Jason J Stanley

(57) ABSTRACT

An exhaust system in an internal combustion engine has an exhaust manifold, an exhaust flange is connected to the exhaust manifold, and a turbocharger is connected to the exhaust flange. The turbocharger has an exhaust inlet flange connected to the exhaust flange. The exhaust manifold has a first passage and a second passage, and the exhaust flange has a first exhaust port and a second exhaust port. The exhaust ports of the exhaust flange each have a generally triangular cross-sectional configuration.

36 Claims, 4 Drawing Sheets

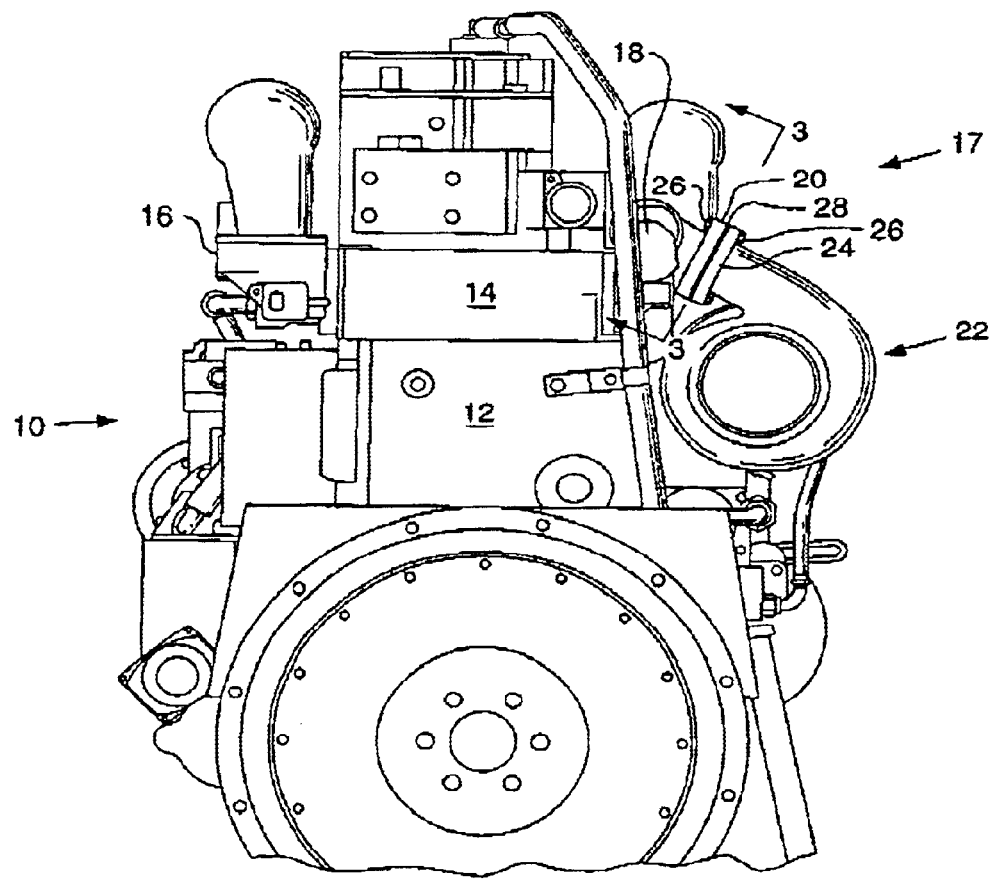
Fig_1_

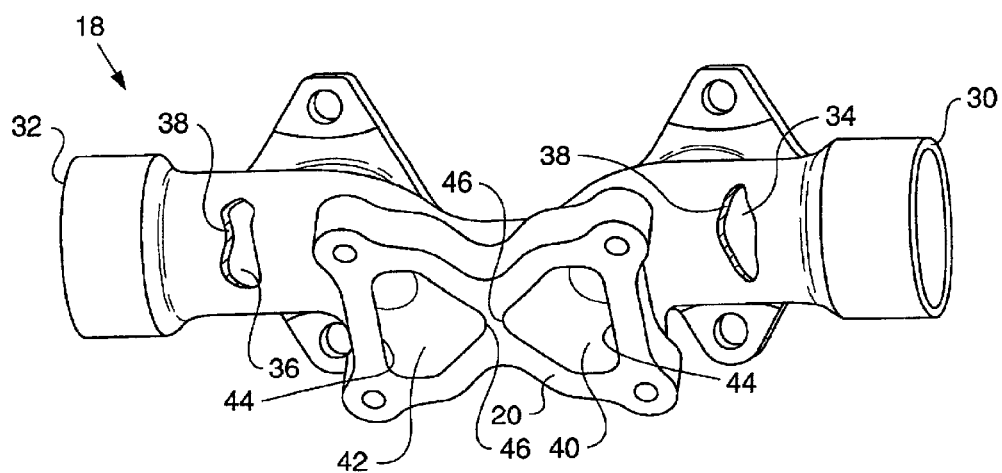
Fig_2_

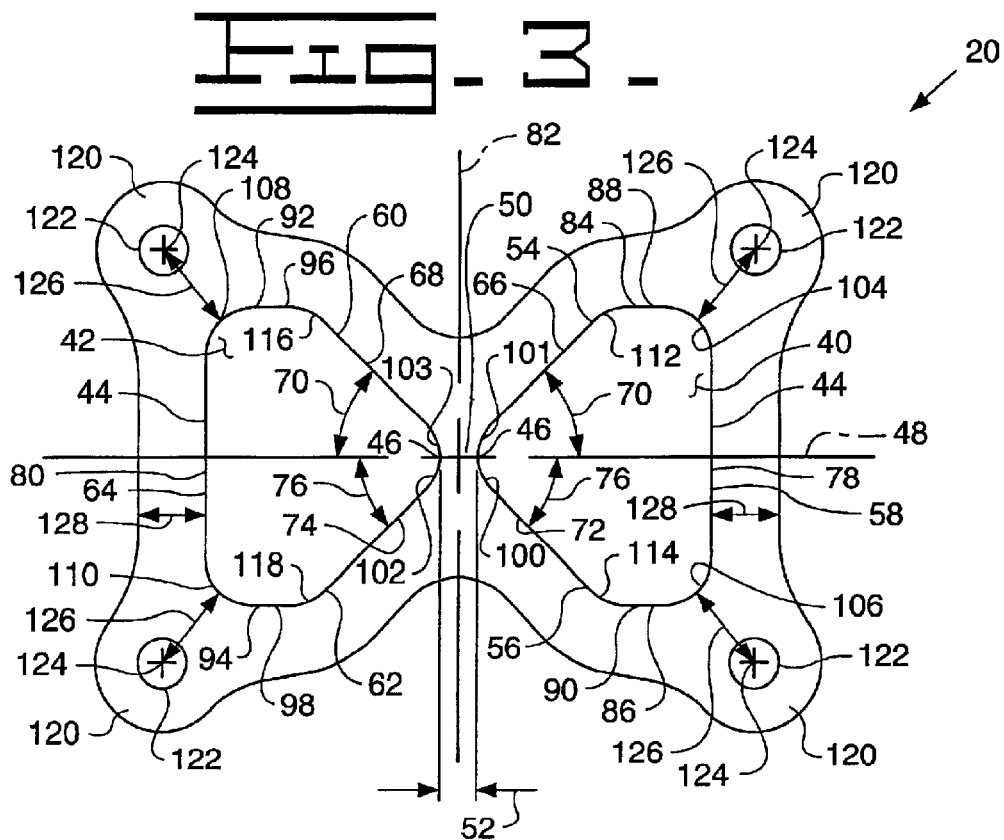
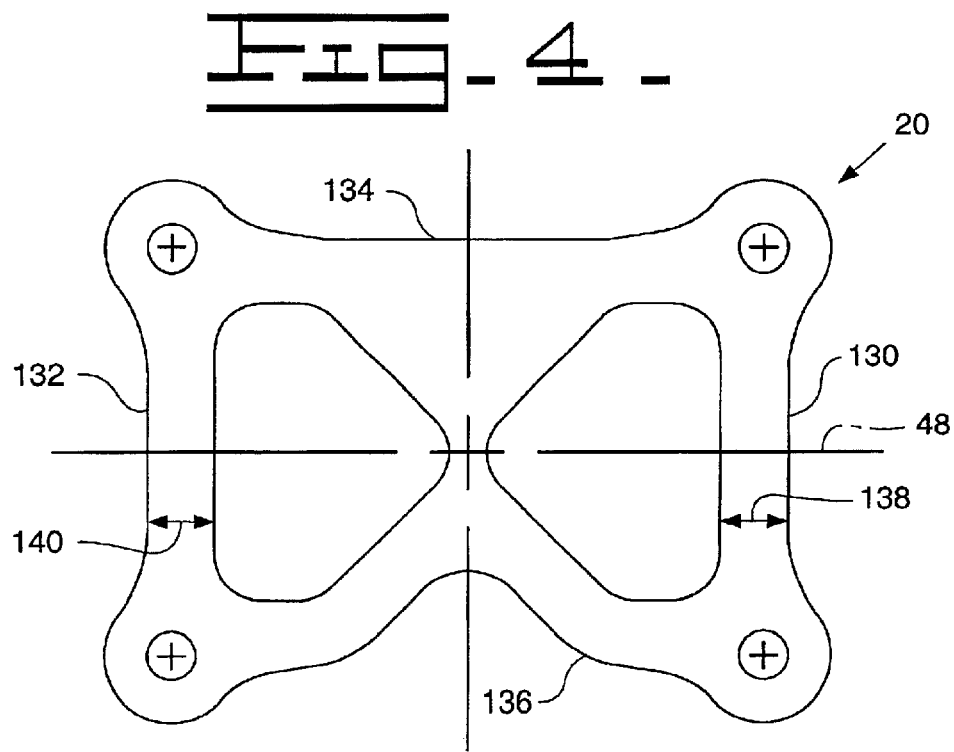

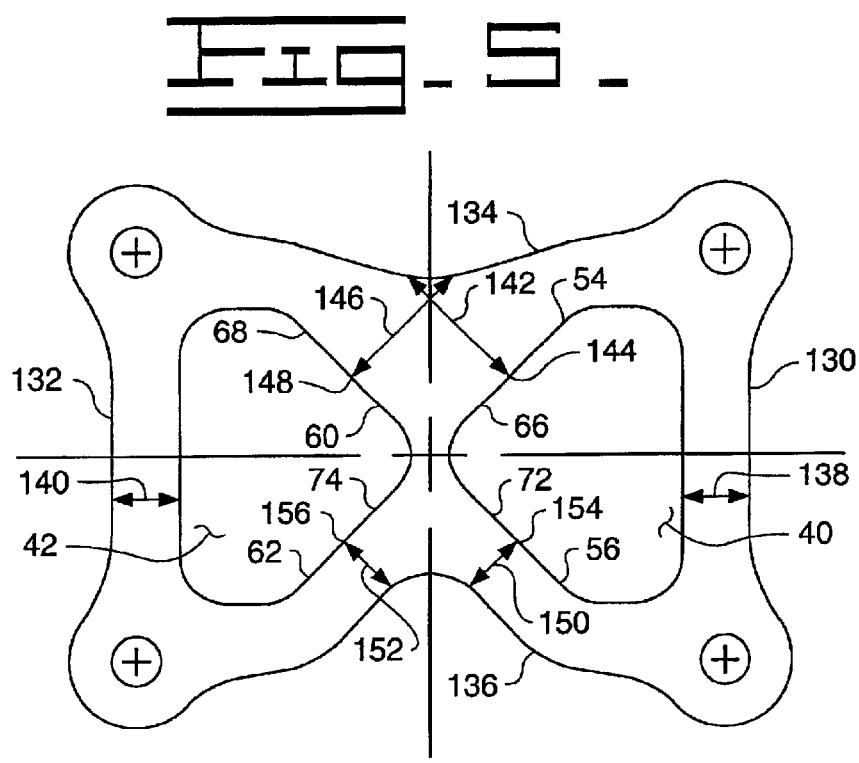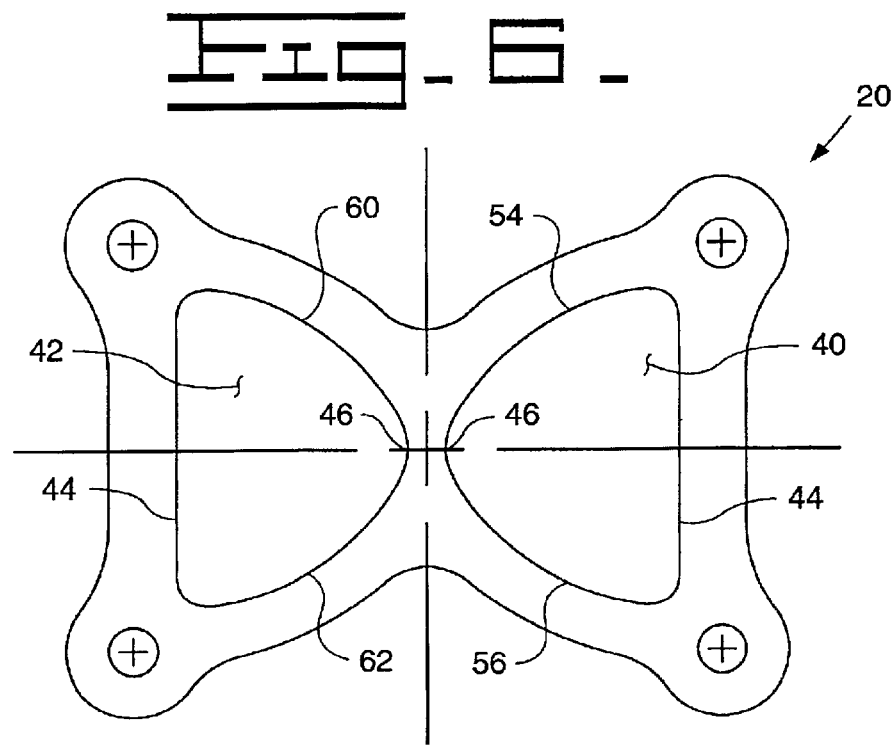

EXHAUST SYSTEM HAVING LOW-STRESS EXHAUST MANIFOLD FLANGE

TECHNICAL FIELD

This invention relates generally to an exhaust system for use with an internal combustion engine, and more particularly to a low-stress exhaust manifold flange.

BACKGROUND

The use of turbochargers in internal combustion engines is well known. Turbochargers increase the mass of air supplied to the engine thereby enabling the increase of the power output of the engine. In addition, the efficiency of the engine is increased by the turbocharger's utilization of the thermal energy contained in the engine's exhaust gases.

However, the connection between a turbocharger and the engine has posed various design challenges. For the engine to operate at optimum efficiency, the engine must transfer as much energy as possible from the exhaust gases of the engine to a turbine of the turbocharger, thereby maximizing the boost provided by the turbocharger. Energy is lost from the flow of exhaust gases in the exhaust manifold due to wall friction, area changes in the manifold, and directional changes in the manifold due to flow separation and the creation of secondary flows. All three of these causes of energy loss are typically present in the area of the exhaust manifold where it joins the turbocharger, i.e. the exhaust manifold flange. Therefore, an optimal exhaust manifold and exhaust manifold flange design is successful in minimizing these energy losses.

When energy is lost from the exhaust gas flow through the exhaust manifold flange and in the area of the exhaust manifold near the flange, the energy is typically transformed via convection into thermal energy in the exhaust manifold and flange. Therefore, if the design of the exhaust system reduces the amount of heat absorption from the exhaust gas flow by the exhaust manifold and the exhaust manifold flange, the energy transferred to the turbine of the turbocharger is increased and the efficiency of the engine is improved. In addition, the exhaust manifold and exhaust manifold flange design that reduces the heat absorption of the manifold and flange increases the operating life of the manifold flange and turbocharger. When the exhaust manifold flange absorbs an excess amount of thermal energy, the flange typically develops stress cracks. Such cracking results in failures and not only requires replacement of the flange and/or a portion of the exhaust manifold with which the flange is integral, but it can also cause damage to the turbine of the turbocharger. For example, debris from the cracked and failed manifold passes into the turbine of the turbocharger. This problem of cracking exhaust manifold flanges has been exacerbated by the recent dramatic increases in internal combustion engine exhaust gas temperatures caused by the industry's drive to increase the power output of engines while reducing unwanted emissions.

An exhaust manifold flange must also have the structural integrity to support a rigid connection with a turbocharger. This rigid connection reduces vibrations between the turbocharger and the flange and ensures that a good seal is maintained between the turbocharger and flange. In addition, the connection between the exhaust manifold flange and the turbocharger is typically the only rigid connection between the turbocharger and the engine. All other connections between the turbocharger and the engine are flexible so that no significant forces will be applied to the turbocharger from thermal expansion of the turbocharger, the engine or the connections. Therefore, an exhaust manifold flange must be capable of supporting the weight of the turbocharger and other forces introduced by the turbocharger to the engine.

One attempt at designing an exhaust manifold flange to reduce the incidence of cracking of the flange is illustrated in U.S. Pat. No. 5,406,795 ("the '795 patent") issued to Raub et al. on Apr. 18, 1995. The flange disclosed in the '795 patent has two exhaust ports. The two exhaust ports are generally trapezoidal in shape and are separated by a thin straight center wall. Experimentation has shown the flange is not capable of handling the increased temperature of the exhaust gases produced by today's internal combustion engines. The thermal energy destroys the center wall. Therefore, an exhaust system is needed that combines the exhaust manifold, the exhaust manifold flange and the turbocharger permitting a rigid connection between the flange and the turbocharger and reducing the thermal energy absorbed by the manifold and the flange. Thus, the operating life of both the flange and the turbocharger is increased, the efficiency of the engine is improved, and the power output of the engine is increased.

SUMMARY OF THE INVENTION

An exhaust system has an exhaust manifold, an exhaust flange connected to the exhaust manifold, and a turbocharger. The exhaust manifold has a plurality of passages, and the exhaust flange has two exhaust ports in fluid communication with the exhaust manifold passages. The exhaust ports of the exhaust flange have a generally triangular cross-sectional configuration. The turbocharger has an exhaust inlet flange that is connected to the exhaust flange. The exhaust inlet flange has two inlet ports that are in fluid communication with the exhaust ports of the exhaust flange.

In another aspect of the exhaust system, the exhaust flange has a first axis that intersects each of the exhaust ports. The exhaust flange also has a first outer surface, a second outer surface, a third outer surface, and a fourth outer surface. At least one of the third outer surface and the fourth outer surface is substantially parallel with the first axis.

A method of manufacturing an exhaust manifold for use in a high-temperature engine includes forming a first exhaust port and a second exhaust port, each exhaust port having a generally triangular configuration. Each exhaust port is then surrounded by a wall thickness.

A high-temperature engine has a cylinder block, a cylinder head, an exhaust manifold connected to at least one of the cylinder block and the cylinder head, and an exhaust flange connected to the exhaust manifold. The exhaust flange has a first exhaust port and a second exhaust port, each exhaust port having a generally triangular configuration.

BRIEF DESCRIPTION OF THE DRAWINGS

FIG. 1 is an end view of an engine having an exhaust system;

FIG. 2 is a perspective view of an exhaust manifold and exhaust flange of the exhaust system used with the engine;

FIG. 3 is a cross-sectional view of one embodiment of the exhaust flange taken along line 3—3 of FIG. 2;

FIG. 4 is a cross-sectional view of another embodiment of the exhaust flange;

FIG. 5 is a cross-sectional view of another embodiment of the exhaust flange; and FIG. 6 is a cross-sectional view of another embodiment of the exhaust flange.

DETAILED DESCRIPTION

Referring to FIG. 1, an internal combustion engine 10 is shown. The engine 10 includes a cylinder block 12, a cylinder head 14 attached to the block 12, an intake manifold 16 connected to the cylinder head 14, each in a conventional manner, and an exhaust system 17. The exhaust system 17 comprises an exhaust manifold 18 connected to the cylinder head 14 in a conventional manner, an exhaust flange 20 connected to the exhaust manifold 18, and a turbocharger 22. In an alternative embodiment, the exhaust manifold 18 is connected to the cylinder block 12. In this application, the exhaust flange 20 is formed as an integral part of the exhaust manifold 18, but as an alternative could be formed separately and welded or connected in another manner. The turbocharger 22 has an exhaust inlet flange 24 connected to the exhaust flange 20. The turbocharger 22 also has a turbine, not shown, and a compressor, not shown. In the embodiment of the engine in FIG. 1, the exhaust inlet flange 24 of the turbocharger and the exhaust flange 20 of the exhaust manifold 18 are connected by a plurality of bolts 26. However, other connection devices may be used, such as a plurality of studs and nuts. In this application, a gasket 28 is positioned between the exhaust flange 20 and the exhaust inlet flange 24.

In FIG. 2, the exhaust manifold 18 has a first end portion 30 and a second end portion 32. A first passage 34 extends from the first end portion 30, and a second passage 36 extends from the second end portion 32. The first passage 34 and the second passage 36 of the exhaust manifold 18 are bounded by a plurality of walls 38. The exhaust flange 20 has a first exhaust port 40 and a second exhaust port 42, each of which has a cross-sectional configuration that is generally triangular in shape. Each exhaust port, 40 and 42, define a base 44 and a peak 46. As used herein, the term "peak" shall have the meaning set forth in Webster's II New College Dictionary, "the point of greatest . . . height: crest." The first exhaust port 40 is in fluid communication with the first passage 34 and the second exhaust port 42 is in fluid communication with the second passage 36. In one embodiment of the exhaust system, the interior of the walls 38 bounding the first passage 34 of the exhaust manifold 18 and the second passage 36 of the exhaust manifold 18 are integral with and transition smoothly into the exhaust flange 20 such that the first passage 34 smoothly transitions into the first exhaust port 40 and the second passage 36 smoothly transitions into the second exhaust port 42.

The exhaust inlet flange 24 of the turbocharger 22 has a first inlet port, not shown, and a second inlet port, not shown. The first inlet port of the exhaust inlet flange 24 is in fluid communication with the first exhaust port 40 of the exhaust flange 20, and the second inlet port of the exhaust inlet flange 24 is in fluid communication with the second exhaust port 42 of the exhaust flange 20. The gasket 28 between the exhaust flange 20 and the exhaust inlet flange 24 may have two ports that are substantially the same shape and size of the exhaust ports, 40 and 42, of the exhaust flange 20 or one larger port that encompasses both exhaust ports, 40 and 42.

In FIG. 3, the exhaust flange 20 has a first axis, denoted by the dashed line 48, that passes through the peak 46 and base 44 of each of the first exhaust port 40 and the second exhaust port 42. The exhaust flange 20 has a center portion 50, having a defined thickness 52, that separates the peaks 46 of the first exhaust port 40 and the second exhaust port 42. The first exhaust port 40 is bounded by a first linear portion 54, a second linear portion 56, and a third linear portion 58. Likewise, the second exhaust port 42 is bounded by a first linear portion 60, a second linear portion 62, and a third linear portion 64. As used herein, the term "linear portion" shall mean "a portion resembling a straight or curved line." Each of the first linear portions, 54 and 60, has a straight segment, 66 and 68 respectively, that extends from the center portion 50 of the exhaust flange 20 at a first defined angle 70 from the first axis 48. Each of the second linear portions, 56 and 62, has a straight segment, 72 and 74, that extends from the center portion 50 of the exhaust flange 20 at a second defined angle 76 from the first axis 48. In the embodiment of the exhaust flange 20 in FIG. 3, the first defined angle 70 and the second defined angle 76 are both approximately forty-five degrees (45°), but other angles may be used. Each of the third linear portions, 58 and 64, have a straight segment, 78 and 80 respectively, that is spaced from the center portion 50 and that is oriented substantially perpendicular to the first axis 48.

In the embodiment of the exhaust flange 20 in FIG. 3, each of the first exhaust port 40 and the second exhaust port 42 is symmetric about the first axis 48. In addition, the exhaust flange 20 has a second axis, denoted by the dashed line 82, that is substantially perpendicular to the first axis 48. The exhaust flange 20 of FIG. 3 is symmetric about the second axis 82.

In the exhaust flange 20 in FIG. 3, the first exhaust port 40 is bounded by a pair of fourth linear portions, 84 and 86. One fourth linear portion 84 has a straight segment 88 connecting the straight segment 78 of the third linear portion 58 and the straight segment 66 of the first linear portion 54. The other fourth linear portion 86 has a straight segment 90 that connects the straight segment 78 of the third linear portion 58 and the straight segment 72 of the second linear portion 56. Likewise, the second exhaust port 42 is bounded by a pair of fourth linear portions, 92 and 94, each having a straight segment, 96 and 98. One fourth linear portion 92 connects the straight segment 80 of the third linear portion 64 and the straight segment 68 of the first linear portion 60, and the other fourth linear portion 94 connects the straight segment 80 of the third linear portion 64 and the straight segment 74 of the second linear portion 62.

In FIG. 3, the straight segment 66 of the first linear portion 54 of the first exhaust port 40 and the straight segment 72 of the second linear portion 56 of the first exhaust port 40 are connected by a blending segment 100 having a first radius 101. Also, the straight segment 68 of the first linear portion 60 of the second exhaust port 42 and the straight segment 74 of the second linear portion 62 of the second exhaust port 42 are connected by a blending segment 102 having a first radius 103. The first exhaust port 40 has a pair of second radii, 104 and 106, that connect each of the straight segments, 88 and 90, of the fourth linear portions, 84 and 86, to the straight segment 78 of the third linear portion 58 respectively. The second exhaust port 42 has a pair of comparable second radii, 108 and 110. The first exhaust port 40 in the exhaust flange 20 of FIG. 3 also has a pair of third radii, 112 and 114, that connect, respectively, the straight segment 88 of the fourth linear portion 84 to the straight segment 66 of the first linear portion 54 and the straight segment 90 of the fourth linear portion 86 to the straight segment 72 of the second linear portion 56. The second exhaust port 42 has a pair of comparable third radii, 116 and 118. In the embodiment of the exhaust flange 20 in FIG. 3, the value of each of the pair of second radii, 104 and 106, and the pair of third radii, 112 and 114, of the first exhaust port 40 and the pair of second radii, 108 and 110, and the pair of third radii, 116 and 118, of the second exhaust port 42 are substantially equal. However, other values of each one of the pair of the second radii and the pair of the third radii are possible.

The exhaust flange 20 in FIG. 3 has four connection zones 120 for connecting the exhaust flange 20 to the exhaust inlet flange 24 of the turbocharger 22. Each connection zone 120 has a hole 122 therein. The hole 122 is dimensioned to receive a connector for connecting the exhaust flange 20 to the exhaust inlet flange 24 of the turbocharger 22. One or more bolts 26 may be used as connectors, but one of ordinary skill in the art will recognize that the use of other connectors is possible. In the embodiment of the exhaust flange 20 in FIG. 3, each of the holes 122 in the connection zones 120 has a center 124, and the center 124 is spaced a defined distance 126 from the nearest of the first exhaust port 40 and the second exhaust port 42. Although the exhaust flange 20 in FIG. 3 has four connection zones 120, one of ordinary skill in the art will appreciate that more or less than four connection zones 120 may be used.

The exhaust flange 20 has a defined wall thickness 128 that surrounds a substantial portion of both the first exhaust port 40 and the second exhaust port 42. In the embodiment of the exhaust flange 20 in FIG. 3, the defined wall thickness 128 is greater than the values of each of the first radii, 101 and 103, the pair of second radii, 104, 106, and 108, 110, the pair of third radii, 112, 114, and 116, 118, and the defined thickness 52 of the center portion 50. However, the defined wall thickness 128 may also be substantially equal to any of the values of the first radii, 101 and 103, the pair of second radii, 104, 106, and 108, 110, the pair of third radii, 112, 114, and 116, 118, or the defined thickness 52 of the center portion 50. Also, in the embodiment of the exhaust flange 20 in FIG. 3, the defined distance 126 between each connection zone hole 122 and the nearest exhaust port, 40 or 42, is approximately equal to the exhaust flange's defined wall thickness 128. However, one of ordinary skill in the art would appreciate that the defined distance 126 may, alternatively, be greater than the defined wall thickness 128.

An alternative embodiment of the exhaust flange 20 is shown in FIG. 4. The exhaust flange 20 has a first outer surface 130, a second outer surface 132, a third outer surface 134, and a fourth outer surface 136. The first outer surface 130 and the second outer surface 132 are intersected by the first axis, designated by the dotted line 48. The first outer surface 130 is separated from the third linear portion 58 of the first exhaust port 40 by a first wall thickness 138, and the second outer surface 132 is separated from the third linear portion 64 of the second exhaust port 42 by a second wall thickness 140. In the embodiment of the exhaust flange 20 in FIG. 4, the third outer surface 134 is substantially parallel with the first axis 48. However, as other embodiments the fourth outer surface 136 can be substantially parallel with the first axis 48, or both the third outer surface 134 and the fourth outer surface 136 can be substantially parallel with the first axis 48.

In another alternative embodiment of the exhaust flange 20, as shown in FIG. 5, a defined distance 142 between the third outer surface 134 and a center 144 of the straight segment 66 of the first linear portion 54 of the first exhaust port 40, measured perpendicular to the straight segment 66, is greater than either of the first wall thickness 138 and the second wall thickness 140. Also, a defined distance 146 between the third outer surface 134 and a center 148 of the straight segment 68 of the first linear portion 60 of the second exhaust port 42, measured perpendicular to the straight segment 68, is greater than either of the first wall thickness 138 and the second wall thickness 140. In another alternative embodiment, defined distances, 150 and 152, between the fourth outer surface 136 and either a center 154 of the straight segment 72 of the second linear portion 56 of the first exhaust port 40 or a center 156 of the straight segment 74 of the second linear portion 62 of the second exhaust port 42, measured perpendicular to the straight segment, 72 or 74, is greater than either of the first wall thickness 138 and the second wall thickness 140.

In another embodiment of the exhaust flange 20, as shown in FIG. 6, the generally triangular configuration of the second exhaust port 42 is D-shaped, i.e. it resembles a capital letter "D," and the configuration of the first exhaust port 40 is a mirror image of the second exhaust port 42. Each of the first exhaust port 40 and the second exhaust port 42 has a first linear portion, 54 and 60, respectively, and a second linear portion, 56 and 62, respectively, that are arcuate. As used herein, the term "arcuate" means "curved or containing an arc." In addition, each of the first exhaust port 40 and the second exhaust port 42 have a base 44 and a peak 46. In the embodiment shown in FIG. 6, the peak 46 of each exhaust port, 40 and 42, is located where the first linear portion, 54 and 60, and the second linear portion, 56 and 62, meet.

The exhaust flanges 20 of the FIGS. 1, 2, 3, 4, 5, and 6 may be composed of one or more different materials. For example, an exhaust flange may be primarily composed of HiSilMoly, SuperSilMoly, Ni-Resist, stainless steel, another alloy, or some other material. The process of manufacturing may be one or more of several alternative processes, such as casting, forging or fabrication. The configuration of the exhaust flange 20 may be formed during the casting, forging or fabrication process or may be accomplished by machining.

INDUSTRIAL APPLICABILITY

During operation of the internal combustion engine 10, air is drawn into the intake manifold 16 and passes into the cylinder head 14 and cylinder block 12. Combustion takes place within the cylinder block 12 in a conventional manner and a flow of hot exhaust gases is passed from the cylinder block 12 through the cylinder head 14 and into the exhaust manifold 18. The exhaust gas flows through the first passage 34 of the exhaust manifold 18 and the second passage 36 of the exhaust manifold 18 towards the exhaust manifold flange 20. The flow of exhaust gas in the first passage 34 of the exhaust manifold 18 flows through the first exhaust port 40 of the exhaust flange 20 and continues through the first inlet port of the exhaust inlet flange 24 of the turbocharger 22 to drive the turbine of the turbocharger 22. Likewise, the flow of exhaust gas in the second passage 36 of the exhaust manifold 18 flows through the second exhaust port 42 of the exhaust flange 20 and continues through the second inlet port of the exhaust inlet flange 24 of the turbocharger 22 to drive the turbine of the turbocharger 22.

The smooth transition between the walls 38 bounding the passages, 34 and 36, of the exhaust manifold 18 and the exhaust flange 20 minimizes the wall friction experienced by the flow of exhaust gas. The heat transferred from the exhaust gas to the exhaust manifold 18 and exhaust flange 20 is reduced. Also, the smooth transition and gradual changes in the cross-sectional area of the exhaust gas flow reduces the incidence of hot spots in the walls 38 and exhaust flange 20. The overall absorption of heat by the exhaust manifold 18 and exhaust flange 20 is reduced. Therefore, the operating life of the exhaust system 17, the exhaust flange 20 and the turbocharger 22 is increased, and the efficiency and power output of the engine 10 is increased.

The orientation of the exhaust ports, 40 and 42, within the exhaust flange 20 increases the operating life of the exhaust flange 20 because the heat absorbed by the exhaust flange 20 is reduced. For example, the shape and dimension of the exhaust ports 40 and 42 establishes the center portion 50 with a geometry that absorbs less heat than the center walls of other exhaust flanges currently in use. In addition, the use of blending connections between the linear portions of the exhaust flange 20 removes the hot spots commonly found in the corners of the ports of other flanges. Thus, use of the exhaust flange 20 increases the energy transferred from the exhaust gases to the turbine of the turbocharger 22, since less heat is lost to the exhaust manifold 18 and exhaust flange 20. Thereby, the overall engine power output and the overall engine efficiency are increased. The exhaust flange 20 is particularly useful in high-temperature engines, i.e. engines with exhaust gas temperatures exceeding approximately 600° Celsius, because other exhaust flange configurations have proven incapable of maintaining their structural integrity at such high temperatures.

The additional thickness or surface area of the alternative embodiments of the exhaust flange 20 in FIGS. 4 and 5, and the related alternative embodiments in which the surface area near the fourth outer surface 136 is increased, results in a higher degree of structural integrity. Therefore, these flanges are better able to support a rigid connection with the turbocharger 22 than the exhaust flange 20 of FIG. 3. In addition, these flanges are less likely to deform due to the force placed upon them by the weight of the turbocharger 22. The best embodiment of the exhaust flange 20 for a particular engine 10 depends upon many factors, such as the weight, size and orientation of the turbocharger 22, and the number and placement of the connection zones 122.

Other aspects, objects, and advantages of this invention can be obtained from a study of the drawings, the disclosure, and the appended claims.

What is claimed is:

1. An internal combustion engine comprising:
a cylinder block;
a cylinder head connected to said cylinder block;
an exhaust manifold connected to at least one of said cylinder block and said cylinder head;
an exhaust flange connected to said exhaust manifold, said exhaust flange having less than three exhaust ports, a first exhaust port of said less than three exhaust ports having a generally triangular configuration and a second exhaust port of said less than three exhaust ports, having a generally triangular configuration; and
a turbocharger connected to said exhaust flange.

2. The engine of claim 1 wherein said exhaust manifold has a first end portion, a first passage extending from said first end portion, a second end portion, and a second passage extending from said second end portion, and said first exhaust port is in fluid communication with said first passage and said second exhaust port is in fluid communication with said second passage.

3. The engine of claim 1 wherein said first exhaust port and said second exhaust port are surrounded by a wall thickness.

4. The engine of claim 3 wherein at least one of said first exhaust port and said second exhaust port is bounded by a plurality of linear portions, said linear portions being connected by blending portions.

5. The engine of claim 4 wherein at least one of said blending portions has a radius with a defined value, said wall thickness has a predefined value, and said defined radius value is approximately equal to said predefined wall thickness value.

6. An exhaust system comprising:
an exhaust manifold having a first end portion and a second end portion, a first passage extending from said first end portion, and a second passage extending from said second end portion;
an exhaust flange connected to said exhaust manifold, said exhaust flange having less than three exhaust ports, a first exhaust port of said less than three exhaust ports being in fluid communication with said first passage and a second exhaust port of said less than three exhaust ports being in fluid communication with said second passage, said first exhaust port and said second exhaust port being separated and each having a pre-established cross-sectional configuration being generally triangular in shape; and
a turbocharger, said turbocharger having an exhaust inlet flange being divided into a first inlet port and a second inlet port, said first inlet portion being in fluid communication with said first exhaust port and said second inlet portion being in fluid communication with said second exhaust port, said exhaust inlet flange being connected to said exhaust flange.

7. The system of claim 6 wherein said exhaust flange has a defined wall thickness positioned about said first exhaust port and said second exhaust port.

8. The system of claim 6 wherein a gasket is positioned between said exhaust flange and said exhaust inlet flange.

9. The system of claim 6 wherein said exhaust flange is composed of HiSilMoly.

10. The system of claim 6 wherein said exhaust flange is composed of stainless steel.

11. The system of claim 6 wherein said exhaust flange is composed of SuperSilMoly.

12. The system of claim 6 wherein said exhaust flange is composed of Ni-Resist.

13. The system of claim 1 wherein the cross-sectional configuration of at least one of said first exhaust port and said second exhaust port is D-shaped.

14. The system of claim 6 wherein at least one of said first exhaust port and said second exhaust port have a base and a peak.

15. The system of claim 14 wherein said exhaust flange has a defined wall thickness positioned about said first exhaust port and said second exhaust port, said first exhaust port and said second exhaust port are separated by a center portion near said peak of each of said first exhaust port and said second exhaust port, said center portion having a thickness that is less than said defined wall thickness of said exhaust flange.

16. The system of claim 14 wherein said exhaust flange has a defined wall thickness positioned about said first exhaust port and said second exhaust port, said first exhaust port and said second exhaust port are separated by a center portion near said peak of each of said first exhaust port and said second exhaust port, said center portion having a thickness that is approximately equal to said defined wall thickness of said exhaust flange.

17. An exhaust system comprising:
an exhaust manifold having a first end portion and a second end portion, a first passage extending from said first end portion, and a second passage extending from said second end portion;
an exhaust flange connected to said exhaust manifold, said exhaust flange having a first exhaust port in fluid communication with said first passage and a second exhaust port in fluid communication with said second passage, said first exhaust port and said second exhaust port being separated and each having a pre-established cross-sectional configuration being generally triangular in shape, at least one of said first exhaust part and said second exhaust port having a base and a peak, said exhaust flange having a first axis passing through said base and said peak of each of said first exhaust port and said second exhaust port, said exhaust flange having a center portion separating said first exhaust port and said second exhaust port near said respective peaks, end each of said first exhaust port and said second exhaust port being is bounded by a first linear portion, a second linear portion, and a third linear portion, said first linear portion having a straight segment extending from said center portion at a first defined angle from said first axis, said second linear portion having a straight segment extending from said center portion at a second defined angle from said first axis, and said third linear portion having a straight segment spared from said center portion and oriented substantially perpendicular to said first axis; and a turbocharger, said turbocharger having an exhaust inlet flange being divided into a first inlet port and a second inlet port, said first inlet portion being in fluid communication with said first exhaust port and said second inlet portion being in fluid communication with said second exhaust port, said exhaust inlet flange being connected to said exhaust flange.

18. The system of claim 17 wherein at least one of said first defined angle and said second defined angle is approximately forty-five degrees.

19. The system of claim 17 wherein at least one of said first exhaust port and said second exhaust port is symmetric about said first axis.

20. The system of claim 17 wherein said exhaust flange has a second axis that is substantially perpendicular to said first axis and said exhaust flange is symmetric about said second axis.

21. The system of claim 17 wherein said exhaust flange has an outer surface parallel with said first axis.

22. The system of claim 17 wherein at least one of said first linear portion of said first exhaust port, said first linear portion of said second exhaust port, said second linear portion of said first exhaust port, and said second linear portion of said second exhaust port is arcuate.

23. The system of claim 17 wherein said straight segment of said first linear portion and said straight segment of said second linear portion are connected by a blending segment.

24. The system of claim 23 wherein said blending segment has a first radius having a defined value and said exhaust flange has a defined wall thickness that is greater than said predefined value.

25. The system of claim 17 wherein said exhaust flange has a first outer surface, a second outer surface, a third outer surface, and a fourth outer surface, said first outer surface and said second outer surface being intersected by said first axis, said first outer surface being separated from said third linear portion of said first exhaust port by a first wall thickness and said second outer surface being separated from said third linear portion of said second exhaust port by a second wall thickness.

26. The system of claim 25 wherein said third outer surface is separated from at least one of said first linear portion of said first exhaust port and said first linear portion of said second exhaust port by a distance greater than at least one of said first wall thickness and said second wall thickness.

27. The system of claim 25 wherein said fourth outer surface is separated from at least one of said second linear portion of said first exhaust port and said second linear portion of said second exhaust port by a distance greater than at least one of said first wall thickness and said second wall thickness.

28. The system of claim 17 wherein at least one of said first exhaust port and said second exhaust port is bounded by a fourth linear portion, said fourth linear portion having a straight segment connecting said straight segment of said third linear portion with at least one of said straight segment of said first linear portion and said straight segment of said second linear portion.

29. The system of claim 28 wherein said straight segment of said fourth linear portion and said straight segment of said third linear portion are connected by a second radius and said straight segment of said fourth linear portion and at least one of said straight segment of said first linear portion and said straight segment of said second linear portion are connected by a third radius.

30. The system of claim 29 wherein said second radius and said third radius are substantially equal.

31. The system of claim 29 wherein said second radius has a defined second radius value, said third radius has a defined third radius value, said exhaust flange has a defined wall thickness, and said exhaust flange defined wall thickness is substantially equal to at least one of said defined second radius value and said defined third radius value.

32. The system of claim 17 wherein said exhaust flange has at least one connection zone for connecting said exhaust flange to said exhaust inlet flange of said turbocharger.

33. The system of claim 32 wherein said exhaust flange has four connection zones.

34. The system of claim 32 wherein said at least one connection zone defines at least one hole dimensioned to receive a connector.

35. The system of claim 34 wherein said hole has a center and said center is spaced at least a defined distance from both of said first exhaust port and said second exhaust port.

36. The system of claim 35 wherein said exhaust flange has a defined wall thickness positioned about said first exhaust port and said second exhaust port and said defined distance of said hole center is approximately equal to said defined wall thickness.

* * * * *